United States Patent
Grannell et al.

(10) Patent No.: US 8,813,691 B1
(45) Date of Patent: Aug. 26, 2014

(54) HIGH EFFICIENCY, TERNARY MIX ENGINE

(71) Applicants: Shawn Grannell, Ann Arbor, MI (US);
Donald E. Gillespie, Ann Arbor, MI (US)

(72) Inventors: Shawn Grannell, Ann Arbor, MI (US);
Donald E. Gillespie, Ann Arbor, MI (US)

(*) Notice: Subject to any disclaimer, the term of this patent is extended or adjusted under 35 U.S.C. 154(b) by 0 days.

(21) Appl. No.: 14/069,793

(22) Filed: Nov. 1, 2013

Related U.S. Application Data

(63) Continuation-in-part of application No. 13/769,497, filed on Feb. 18, 2013, now abandoned.

(51) Int. Cl.
*F02B 47/02* (2006.01)
*F02M 25/038* (2006.01)

(52) U.S. Cl.
CPC .................. *F02M 25/038* (2013.01)
USPC ...... 123/25 P; 123/25 R; 123/25 B; 123/25 C

(58) Field of Classification Search
CPC ............ F02B 47/02; F02B 1/04; F02B 53/02; F02D 41/401
USPC ..................... 123/25 B, 25 C, 25 P
See application file for complete search history.

(56) References Cited

U.S. PATENT DOCUMENTS

| | | | |
|---|---|---|---|
| 1,088,292 A | 2/1914 | Milne | |
| 1,676,264 A | 7/1928 | Hill | |
| 2,919,540 A | 1/1960 | Worth | |
| 3,842,808 A * | 10/1974 | Cataldo | 123/25 P |
| 3,983,882 A | 10/1976 | Billings | |
| 3,995,421 A | 12/1976 | Kuroiwa | |
| 4,122,803 A | 10/1978 | Miller | |
| 4,201,058 A | 5/1980 | Vaughan | |
| 4,402,182 A | 9/1983 | Miller | |
| 4,409,932 A | 10/1983 | Gill | |
| 4,637,352 A | 1/1987 | Green | |
| 4,909,192 A | 3/1990 | Forster et al. | |
| 5,085,176 A * | 2/1992 | Brinkley, III | 123/3 |
| 5,099,802 A * | 3/1992 | Forster | 123/25 F |
| 6,170,441 B1 | 1/2001 | Haldeman et al. | |
| 6,463,890 B1 * | 10/2002 | Chomiak | 123/25 P |
| 7,377,267 B2 | 5/2008 | Boyer et al. | |
| 7,469,662 B2 | 12/2008 | Thomas | |
| 8,662,057 B2 | 3/2014 | Kuroki et al. | |
| 2003/0188700 A1 * | 10/2003 | Mitsuhashi et al. | 123/25 C |
| 2004/0003781 A1 * | 1/2004 | Yuki et al. | 123/25 C |
| 2006/0225672 A1 * | 10/2006 | Donahue et al. | 123/25 P |
| 2007/0022977 A1 | 2/2007 | Crower | |
| 2008/0032245 A1 * | 2/2008 | Bushnell et al. | 431/11 |
| 2008/0223332 A1 * | 9/2008 | Maro et al. | 123/25 R |
| 2009/0229786 A1 | 9/2009 | Freymann et al. | |
| 2010/0089342 A1 | 4/2010 | Wegner et al. | |
| 2012/0004830 A1 * | 1/2012 | Miyagawa et al. | 701/103 |

(Continued)

FOREIGN PATENT DOCUMENTS

JP 4648466 B2 3/2011

*Primary Examiner* — Lindsay Low
*Assistant Examiner* — Tea Holbrook
(74) *Attorney, Agent, or Firm* — Gifford, Krass, Sprinkle, Anderson & Citkowski, P.C.

(57) ABSTRACT

Pressurized and superheated, dry steam is admitted into the working chamber of a spark ignition engine for the purpose of increasing the thermal efficiency of the engine. The steam is admitted into the working chamber near the end of compression, and before ignition of the fuel. An igniter ignites the fuel. Additional work is pneumatically recovered from the steam, thus augmenting the total work obtained by the engine.

17 Claims, 7 Drawing Sheets

(56) References Cited

U.S. PATENT DOCUMENTS

| | | |
|---|---|---|
| 2012/0036850 A1 | 2/2012 | Ernst et al. |
| 2012/0210713 A1 | 8/2012 | Ernst et al. |
| 2012/0276463 A1 | 11/2012 | Grannell et al. |
| 2013/0068202 A1 | 3/2013 | Kardos et al. |

* cited by examiner

HIGH EFFICIENCY, TERNARY MIX ENGINE

REFERENCE TO RELATED APPLICATIONS

This application is a continuation-in-part of U.S. patent application Ser. No. 13/769,497, filed Feb. 18, 2013, which is incorporated herein by reference.

FIELD OF THE INVENTION

The present invention relates generally to internal combustion engines admitting steam into the working chamber for the purpose of increasing the efficiency of the engine, and more particularly, to the invention disclosed herein, referred to as a "Ternary Mix Engine", wherein a ternary mixture comprising fuel, oxidizer, and steam is formed under compression. The ternary mixture is combusted upon ignition of the fuel by an igniter. The steam augments the work obtained by the engine.

BACKGROUND OF THE INVENTION

Due to rising fuel prices and concerns about future fuel availability, many have sought to increase the efficiency of engines. Desirably, by increasing engine efficiency, less fuel is consumed, and the cost of fueling internal combustion engines is decreased.

A large quantity of moderate-to-high temperature heat is rejected by an engine. Exhaust gases leave the engine at a high temperature, and heat escaping through the working chamber boundaries, and/or due to friction, may be collected at an elevated engine block temperature. Pressurized and superheated, dry steam is generated with heat that is rejected by the engine. This steam is admitted into the same working chamber, in which the fuel is also burned. Additional work is pneumatically recovered from the steam, thus augmenting the total work obtained by the engine.

U.S. Pat. Nos. 1,676,264; 2,919,540; 3,995,421 and 4,122,803 disclose steam-augmented engines, in which a substantial portion of the steam is admitted into the working chamber during or after combustion of the fuel, that is, after ignition of the fuel.

U.S. Pat. Nos. 1,088,292; 4,402,182; and 4,409,932 and disclose steam-augmented engines, in which all of the steam is admitted into the working chamber, within the "power stroke". No further description is given for admitting the steam before ignition of the fuel.

U.S. Pat. No. 4,637,352 discloses a steam-augmented piston engine, in which steam is admitted into the working chamber, either at the very end of the "compression stroke" or at the very beginning of the "power stroke", both at exactly top center. No further description is given for admitting the steam before ignition of the fuel.

U.S. Pat. No. 6,463,890 discloses an engine that either admits steam into the working chamber after ignition of the fuel, or into a region separate from the fuel, or both, and thus does not form a substantially homogeneous ternary mixture comprising a majority of the steam, a majority of the air, and a majority of the fuel before ignition of the fuel.

U.S. Pat. No. 6,170,441 discloses an engine admitting a supercritical mixture of fuel and steam into the working chamber near the end of compression or near top center. No further description is given for admitting at least a majority of the steam and at least a majority of the fuel into the working chamber before ignition of the fuel.

U.S. Pat. No. 3,842,808 discloses a steam-augmented engine, wherein the fuel is drafted into the working chamber, and superheated steam is admitted into the working chamber at a steam admission temperature that is controlled or chosen such that the steam ignites the fuel. An early portion of the steam appears to ignite the fuel before the remaining late portion of the steam can be admitted into the working chamber. Admission of at least a majority of the steam into the working chamber, before ignition of the fuel, is not shown.

Japanese Patent JP4648466, has issued from Japanese Patent Application No. JP2009168039, which was also published as U.S. Patent Publication No. 2004/0003781. U.S. Patent Publication No. 2003/0188700 was also published on a similar invention which appears to be from the same line of effort. These reports relate to steam-augmented engines using direct injected and compression ignited fuel. In all embodiments disclosed in U.S. Patent Publication No. 2004/0003781, the direct injected fuel is autoignited by contacting of the fuel by the air and/or steam. An early portion of the fuel appears to ignite before the remaining late portion of the fuel can be admitted into the working chamber. Admission of a majority of the fuel into the working chamber, before ignition of the fuel, is not shown.

The well-known method, for preventing knock, comprises direct injection of a fuel and heterogeneous combustion substantially within the fuel injection interval, such that the combustion rate is limited by the rate of fuel injection. In such a combustion mode, a late, major portion of the fuel is admitted into the working chamber after ignition of an early, minor portion of the fuel. However, a large convective heat loss occurs if a gaseous fuel is combusted in this manner. This large convective heat loss explains the 10 percent fuel economy loss that is experienced in operation of direct injected, methane fueled engines that admit most of the methane into the working chamber after ignition of the fuel, as compared to otherwise similar engines combusting only liquid diesel oil. This fuel economy difference is disclosed in "Norcal Prototype LNG Truck Fleet: Final Results", authored by Kevin Chandler and Ken Proc in July 2004. A hydrogen fueled engine suffers an even larger efficiency loss than does a methane fueled engine if operated in this manner, because hydrogen displaces about 3.3 times more volume than does methane, for the same quantity of energy.

Gaseous fuels such as hydrogen are listed among the possible fuels that can be used in the invention disclosed in U.S. Patent Publication No. 2004/0003781. However, the drawings and description appear to be directed to the use of a direct injected liquid fuel that is autoignited, and the majority of the fuel appears to be admitted into the working chamber after ignition of an early, minor portion of the fuel. The invention in U.S. Patent Publication No. 2004/0003781 would not have suffered a large convective heat loss when using a liquid fuel in the manner described, because liquid fuels displace a much smaller volume than do gaseous fuels, at a broad range of pressures and for the same quantity of energy. The inventors in U.S. Patent Publication No. 2004/0003781 appear not to have anticipated the necessity of admitting at least a majority of a direct injected gaseous fuel into the working chamber before ignition of the fuel.

Based on the foregoing, there is a need for a steam-augmented spark ignition engine, wherein a yet-to-be-burned ternary mixture comprising fuel, oxidizer, and steam is formed under compression. The ternary mixture is combusted upon ignition of the fuel by an igniter. The steam is admitted into the working chamber of the engine within the final one third of the compression time interval and before the ignition of the fuel. Both the fuel and the oxidizer are flowed into the working chamber before the ignition of the fuel.

LIST OF DEFINITIONS

Air: The naturally occurring oxygen-containing gas mixture containing about 21 percent oxygen by volume on a dry basis.

Bottom Center: The time at which the volume of the working chamber is maximized, at the beginning of compression. For the leaf blower engine used herein, bottom center is at −180 degrees crank angle.

Compression Ratio: The volume of the working chamber at bottom center, divided by the volume of the working chamber at top center.

Compression Time Interval: The time interval beginning at bottom center and ending at top center. In all cases, the working cycle comprises compression of a fuel-containing mixture during at least a late portion of the compression time interval before top center, combustion of the fuel-containing mixture near top center, and expansion of the combusted mixture after top center, thereby obtaining work.

Direct Injection: A fluid delivery method, wherein a pressurized fuel or a pressurized oxidizer is sprayed, injected, admitted, or otherwise flowed directly into the working chamber within or after the final one third of the compression time interval.

Drafting: A fluid delivery method, wherein a fuel, an oxidizer, or a buffer gas is pulled, blown, admitted, or otherwise flowed into the working chamber near or before bottom center.

Igniter: A spark plug or other device that initiates a flame kernel in the working chamber of an engine. This definition is broadened, to cover within its scope, other electric igniters such as plasma jet plugs, optical igniters such as laser plugs, chemical-based igniters such as an admission valve for direct injecting a comparatively small quantity of a hypergolic fuel or hypergolic oxidizer, an enhanced igniter configuration such as dual ignition, or any other igniters or combinations of igniters that are known to the art.

Ignition: The beginning of substantial combustion of the fuel. About 5-10 percent of the fuel is burned at ignition.

Ignition Delay: For spark ignition, this is the delay of ignition after the spark. One or more flame kernels begin growing at the spark, but it is only when the flame kernels grow large enough, such that fuel is combusted at an appreciably high rate, that ignition is said to have occurred. Throughout the literature on spark ignition engines, "spark" and "ignition" are treated as separate events. The same convention is used herein.

Spark: An event that initiates one or more flame kernels. This definition is broadened, to cover within its scope, a laser pulse, a plasma jet, an electric arc, the beginning of direct injection of a comparatively small quantity of a hypergolic fuel or hypergolic oxidizer, or any of the other methods known to the art for initiating a flame kernel.

Steam Admission Temperature: The temperature of the steam immediately before the steam is sprayed, injected, admitted, or otherwise flowed into the working chamber.

Steam/Air Mole Ratio: Moles of steam admitted or flowed into the working chamber per mole of air present in the working chamber, wherein one mole of air contains about 0.21 moles of oxygen and 0.79 moles of substantially inert gas, mostly nitrogen.

Superheated Steam: Fully gaseous, dry steam that is either heated to a temperature that is higher than the boiling temperature of water at the steam pressure, or heated to a temperature that is higher than the dew point of a mixture of steam and another gas at the partial steam pressure, or heated to a temperature that is higher than the critical temperature of water, which is about 374° C.

Thermal Inertia: The square root of the mathematical product, of volumetric heat capacity multiplied by thermal conductivity.

Top Center: The time at which the volume of the working chamber is minimized, at the end of compression and beginning of expansion. For the leaf blower engine used herein, top center is at zero degrees crank angle.

Working Chamber: The engine chamber within which the fuel is combusted, and work is obtained. The working chamber contains the working fluid, comprising combustion gases and steam. The fuel is burned near top center. The working chamber comprises at least one movable boundary for performing compression of the working fluid before top center, and expansion of the working fluid after top center, thereby obtaining work.

SUMMARY OF THE INVENTION

The Ternary Mix Engine comprises a high efficiency spark ignition engine admitting superheated steam into the working chamber. Admission of steam, a direct injected gaseous fuel or oxidizer, or any other gas into the working chamber causes significant convection of the working fluid. The convection, due to gas admission, causes an additional convective heat loss, from the working fluid, to the working chamber boundaries. This additional convective heat loss is small, if all admitted gases are admitted before any substantial portion of the fuel is combusted, because the working fluid is still relatively cool, before the fuel is combusted.

The additional convective heat loss becomes much larger, and the efficiency of the engine suffers accordingly, if a large portion of any gas is admitted into the working chamber after a substantial portion of the fuel is combusted, because the working fluid is relatively much hotter than the working chamber boundaries, after a substantial portion of the fuel is combusted. The additional convective heat loss from the working fluid, due to admission of steam, fuel, or oxidizer, is minimized when all entire portions of steam, fuel, and oxidizer are admitted into the working chamber before ignition of the fuel.

In the Ternary Mix Engine, the majorities of the admitted steam, fuel, and oxidizer are admitted into the working chamber before ignition of the fuel, in order to avoid a large convective heat loss, and also to maximize the ignitability and the flammable tolerance for steam. A majority of all admitted steam is admitted into the working chamber within the final one third of the compression time interval, in order to maximize the net recovery of work from the steam. As a consequence of the conclusions reached herein about convective heat loss and optimization of steam admission timing for maximum efficiency, the Ternary Mix Engine requires the formation, under compression, of a yet-to-be-burned ternary mixture comprising steam, fuel, and oxidizer, for which the invention is named.

The fuel is not ignited by contacting of the fuel by the steam. If the fuel were to be ignited by contacting of the fuel by the steam, then an early portion of the steam would ignite the fuel before the remaining late portion of the steam could be admitted into the working chamber, thereby incurring an excessive additional convective heat loss upon admission of the remaining late portion of the steam. Ignition of the fuel by the steam is avoided by choosing a steam admission temperature that is lower than the autoignition temperature of the fuel.

The fuel is not compression ignited in the Ternary Mix Engine. Drafted fuel would ignite in a manner that is not easily controlled, if the drafted fuel were to be compression ignited. An early portion of a direct injected gaseous fuel would ignite before the remaining late portion of the fuel could be admitted into the working chamber, thereby incurring an excessive additional convective heat loss upon admission of the remaining late portion of the fuel, if the gaseous fuel were to be compression ignited or otherwise ignited by contacting of the fuel by the oxidizer or by the steam. Autoignition of the fuel is avoided by choice of compression ratio, possibly in combination with intercooling of any drafted gases before compression, such that the yet-to-be-burned portions of the working fluid are not compressed beyond the autoignition temperature of the fuel.

The fuel is ignited by an igniter in the Ternary Mix Engine. The igniter initiates a flame kernel at a spark, and this action also causes the later ignition of the fuel. The timing of ignition is responsive to spark timing or another igniter parameter.

Drafted Fuel Example: In one example of drafting, the working chamber undergoes a working cycle comprising the following events, in order: working chamber opening for intake of a drafted mixture of air and fuel, working chamber closure, compression of the air and fuel by a piston, admission of superheated steam into the working chamber, thereby forming a substantially homogeneous ternary mixture comprising the compressed mixture of air and fuel and the admitted steam, ignition of the fuel by an igniter, combustion of the ternary mixture upon the ignition of the fuel, expansion of the combusted mixture by the piston, and working chamber opening for exhaust. The fuel is not ignited by contacting of the fuel by the steam. Ignition of the fuel, possibly by an early portion of the steam, would have been inconsistent with admitting the remaining late portion of steam before ignition of the fuel. All of the fuel and air, and preferably all of the steam, are present in the working chamber as a substantially homogeneous ternary mixture at the ignition of the fuel. The steam appears in the working chamber under compression without having been compressed by the working chamber. In subsequent expansion, the steam augments the work obtained by the engine.

Direct Injected Fuel Example: In one example of direct injection, the working chamber undergoes a working cycle comprising the following events, in order: working chamber opening for intake of drafted air, working chamber closure, compression of the air by a piston, admission of superheated steam substantially simultaneously with admission of a direct injected gaseous fuel into the working chamber, thereby forming a substantially homogeneous ternary mixture comprising the compressed air, the direct injected fuel, and the admitted steam, ignition of the fuel by an igniter, combustion of the ternary mixture upon the ignition of the fuel, expansion of the combusted mixture by the piston, and working chamber opening for exhaust. The fuel is not ignited by contacting of the fuel by the steam or by contacting of the fuel by the air. Ignition of possibly an early portion of the direct injected gaseous fuel, by possibly an early portion of the steam or by the air, would have been inconsistent with admitting the entire portions of steam and gaseous fuel into the working chamber before ignition of the fuel. All of the air, and preferably all of the direct injected gaseous fuel and admitted steam, are present in the working chamber as a substantially homogeneous ternary mixture at the ignition of the fuel. Both the steam and the direct injected gaseous fuel appear in the working chamber under compression without having been compressed by the working chamber. In subsequent expansion, both the steam and the direct injected gaseous fuel augment the work obtained by the engine.

In the Ternary Mix Engine, a drafted fuel may be either gaseous or liquid. Drafting is the preferred method of fuel delivery for low-pressure gaseous fuels and also for liquid fuels, because there is little or no potential for pneumatic recovery of work from these fuels. Furthermore, drafting is relatively simple, transparent, and inexpensive, and drafting facilitates mixing of the fuel and air. Drafting is achieved by flowing both separate fuel and air, or a single combined mixture of fuel and air into the working chamber before substantial compression.

In the Ternary Mix Engine, a high-pressure gaseous fuel may be direct injected. A significant quantity of work can be pneumatically recovered from a pressurized gaseous fuel, in much the same manner that work is pneumatically recovered from the steam. In order to maximize efficiency and to minimize heat loss from the working fluid, at least a majority of the direct injected gaseous fuel must be admitted into the working chamber before the ignition of the fuel. Preferably, the entire portion of the direct injected gaseous fuel is admitted into the working chamber before the ignition of the fuel.

A gaseous fuel, having a pressure of a few bars, may be admitted into the working chamber shortly after the start of compression. The separately flowed fuel serves to further supercharge the working chamber because the air is not allowed to flow back into an air intake manifold when the working chamber pressure rises upon admission of the fuel. Backfire is mitigated because the air intake manifold contains only air, and a separate fuel manifold contains only fuel.

A liquid fuel may be direct injected. Whether a liquid or gaseous fuel is drafted, direct injected, or otherwise admitted into the working chamber, at least a majority of the fuel is present in the working chamber at the ignition of the fuel. Preferably, the entire portion of the fuel is present in the working chamber as a substantially homogeneous ternary mixture comprising the fuel, an oxidizer and steam at the ignition of the fuel, thereby maximizing ignitability and maximizing the flammable tolerance for steam.

A liquid or gaseous oxidizer other than air or oxygen may be used, possibly in combination with air or oxygen. Whether a liquid or gaseous oxidizer is drafted, direct injected, or otherwise admitted into the working chamber, at least a majority of the oxidizer is present in the working chamber at the ignition of the fuel. Preferably, the entire portion of the oxidizer is present in the working chamber as a substantially homogeneous ternary mixture comprising the fuel, the oxidizer and steam at the ignition of the fuel, thereby maximizing ignitability and maximizing the flammable tolerance for steam.

Knock is mitigated or controlled by the steam, or by changing the ratio of fuels if more than one fuel is used. For example, the tendency to knock can be reduced by using more steam and/or by providing the steam at a lower steam admission temperature. In another example, ammonia is used with another fuel or set of fuels. The tendency to knock can be reduced by using more ammonia and less of the other fuel or fuels. A reduction in the tendency to knock enables the use of higher compression ratios, or operation at higher loads at a given compression ratio, which results in a higher efficiency or a higher power density.

The Ternary Mix Engine is also operable with working chamber configurations other than piston and cylinder. For example, any of the various rotary engines that are known to the art can be modified for practicing the invention. In a rotary engine, compression and expansion of the working fluid are performed by a rotor that serves as the movable working chamber boundary for a plurality of working chambers, for example, three working chambers per rotor if the rotor is triangular. In all cases, a piston, rotor, vanes, or other equivalent movable working chamber boundary or set of boundaries is provided for performing compression and expansion of the working fluid within the working chamber or chambers. Most generally, each working chamber is operable to compress a working fluid within a compression time interval, followed by expansion of the working fluid.

The fuel is preferably hydrogen, or contains a substantial fraction of hydrogen, because the implementation of the Ternary Mix Engine produces the largest efficiency gain when the fuel comprises hydrogen. The ternary mixture must support flame propagation throughout, without knocking. Hydrogen's high autoignition temperature, high diffusivity, and high flammable tolerance for steam make it particularly well suited for forming ternary mixtures that meet these requirements.

In many applications, the hydrogen is stored as liquid anhydrous ammonia at a pressure of about 10 bars. The ammonia is converted into a hydrogen-containing gas mixture, using one of the Ammonia Flame Crackers disclosed in U.S. Patent Publication No. 2012/0276463, the content of which is incorporated herein by reference. The hydrogen may be produced at a near-ambient pressure, or at a supercharged pressure of a few bars, and then drafted.

Hydrogen may also be produced at a high pressure of about 50 to 100 bars and then direct injected. In the Ternary Mix Engine, a direct injected fluid need not have a pressure exceeding the peak firing pressure, because peak pressure occurs about halfway through combustion or later, which is long after all of the admission valves have been closed. Effectiveness for admission of pressurized gas into a working chamber near the end of compression has been demonstrated for pressures as low as 20 bars. A fluid pressure of 100 bars is adequate for direct injection of the fluid into a working chamber having a peak firing pressure substantially higher than 100 bars. In one example, liquid ammonia is pressurized by a pump to a pressure of about 50 to 100 bars and then vaporized at the same pressure. Gaseous oxygen is extracted from air and pressurized to the same pressure. Pressurized oxygen may also be obtained from a tank of high pressure oxygen, from liquid oxygen, or from hydrogen peroxide which is pressurized and then decomposed. Other oxidizers such as nitrous oxide may also be used for autothermally cracking ammonia. The pressurized gaseous ammonia and pressurized oxygen or other oxidizer are flowed into an Ammonia Flame Cracker, in which they are transformed into a pressurized hydrogen-containing gas mixture, which is direct injected. Much more work is pneumatically recovered from the hydrogen-containing gas mixture, than is required for extracting oxygen from air and then pressurizing the oxygen. Only a comparatively small quantity of work is required for pressurizing the liquid ammonia.

In some specialty aircraft applications, the engine breathes air and the hydrogen is stored as a cryogenic liquid, thereby minimizing weight. The liquid hydrogen is pressurized by a cryogen pump, to a pressure of about 50 bars or higher as required for direct injection of the gas. The liquid hydrogen is then vaporized to gas at the same pressure. The gaseous hydrogen is direct injected substantially simultaneously with the admission of the steam, thereby forming a ternary mixture comprising the air, the hydrogen, and the steam. Much more work is pneumatically recovered from the gaseous hydrogen, than is required for pressurizing the liquid hydrogen.

For some applications such as submarine propulsion, both substantially pure oxygen and substantially pure hydrogen are stored in separate containers as cryogenic liquids. The oxygen and the hydrogen are drawn from the respective containers and pressurized by separate cryogen pumps, separately vaporized under pressure, and separately direct injected substantially simultaneously with the admission of the steam, thereby forming a ternary mixture comprising the oxygen, the hydrogen, and the steam. Either the hydrogen or the oxygen may be combined with the steam before direct injection. Work is pneumatically recovered from the steam, the hydrogen, and the oxygen. The principal exhaust product is water, which is fully condensable. A substantially inert buffer gas such as nitrogen, carbon dioxide, argon, krypton, xenon, or a combination of these may be drafted into the working chamber through an intake conduit and then recovered from the exhaust gas for drafting in subsequent cycles. The working chamber compresses the drafted buffer gas within the compression time interval. A buffer gas comprising nitrogen can readily be obtained by circulating air as an initial buffer gas, and burning up the oxygen in the air by combustion with the hydrogen. Argon may be added to the buffer gas in order to increase the ratio of specific heats of the working fluid and to decrease the thermal conductivity of the working fluid. The thermal conductivity of the working fluid can be further decreased by using krypton or xenon. An engine using a monoatomic buffer gas has a lower optimum compression ratio, than does an air-breathing engine.

An air-breathing engine may utilize a combination of liquid hydrogen and liquid oxygen. An air-breathing engine's working chamber receives drafted air at the ambient pressure, or at a supercharged pressure of a few bars, and the working chamber compresses the air within the compression time interval. In one example, both the liquid hydrogen and liquid oxygen are vaporized at a low pressure and drafted into the working chamber with the air. In another example, the liquid hydrogen is stored in a container that is jacketed within an outer layer separately containing the liquid oxygen, to minimize boil off losses of the hydrogen. The liquid hydrogen is drawn from the container, pressurized by a pump to a pressure of about 50 bars or more, vaporized at that pressure, and direct injected substantially simultaneously with the admission of the steam. The hydrogen may be combined with the steam before direct injection. The oxygen is vaporized at a low pressure and at a low, nominal boil off rate and drafted into the working chamber with the air. In yet another example, both the liquid oxygen and the liquid hydrogen are drawn from separate containers, separately pressurized by pumps, separately vaporized under pressure, and separately direct injected substantially simultaneously with the admission of the steam. Either the hydrogen or the oxygen may be combined with the steam before direct injection. In all of these cases, the ternary mixture comprises hydrogen, steam, and oxygen from a combination of sources.

In 2-cycle operation, the working chamber opening for exhaust of a working cycle is substantially overlapped in time with the working chamber opening for intake of the next working cycle. Exhaust gas is cleared from the working chamber by displacing the exhaust gas with the next charge of incoming air, or fuel and air, or buffer gas. The exhaust gas may be overblown from the working chamber with air or with buffer gas.

In 4-cycle operation, the working chamber opening for exhaust of a working cycle and the working chamber opening for intake of the next working cycle are substantially separate in time. Exhaust gases are cleared from the working chamber by decreasing the volume of the working chamber while an exhaust valve is open. After that, the next charge of air, or fuel and air, or buffer gas is flowed into the working chamber by increasing the volume of the working chamber while an intake valve is open.

Only gaseous water enters the working chamber during the steam admission interval. At least a small margin of superheat is recommended to ensure that the steam remains dry, that is, fully gaseous, because any liquid water present in the working chamber, at or about the time of fuel combustion, has its heat of vaporization effectively subtracted from the heat released by combustion of the fuel, and the efficiency of the engine suffers accordingly. Water has a vapor pressure of 40 bars at 250° C., and 100 bars at 311° C. In one example, the steam pressure is 40 bars, and the steam is superheated to a temperature higher than 250° C. in order to ensure that the steam remains fully gaseous. In another example, a steam mixture containing 50 percent water vapor and 50 percent hydrogen by volume, at a total pressure of 80 bars, has a partial steam pressure of 40 bars and should also be superheated to a temperature higher than 250° C. In yet another example, pure or mixed steam having a partial steam pressure of 100 bars is superheated to a temperature higher than 311° C. in order to ensure that the steam remains fully gaseous. In yet another example, the steam is heated above the critical temperature of water, about 374° C., and the steam remains fully gaseous at a broad range of combinations of mixture ratio and total pressure.

The quantity and distribution of steam, fuel, and oxidizer are controlled in the Ternary Mix Engine, such that there are no large fuel-containing portions of the working fluid that do not burn. Convection of the working fluid, by any incoming gases, tends to homogenize at least a majority of the working fluid. The invention does not aim to keep the steam separate from the substantial bulk of the fuel and oxidizer. The steam is substantially homogeneously mixed with the fuel and oxidizer throughout at least a majority of the working fluid, before ignition. In some cases, the entire portions of steam, fuel, and oxidizer are homogeneously mixed throughout the entire portion of the working fluid, before ignition. Homogeneous mixing, of the steam with the fuel and oxidizer, maximizes the flammable tolerance for steam. In one example, twice as much steam can be used if the steam is homogeneously mixed with the entire portions of fuel and oxidizer before ignition, than can be used if the steam were to be mixed with only half of the fuel and oxidizer.

In some cases, the working chamber includes a prechamber surrounding the igniter. Prechambers incorporated into an igniter and other prechambers are known to the art. If a prechamber is used, then a minor portion of the fuel and oxidizer is held in a prechamber surrounding the igniter, and the steam is uniformly combined with the remaining majority of fuel and oxidizer outside the prechamber. The ternary mixture comprises substantially all of the steam and the majorities of the fuel and oxidizer outside the prechamber. The minor portion of the fuel is ignited within the prechamber, separately from the ternary mixture, and then a flame propagates from the prechamber to the remaining majority of fuel and oxidizer in the ternary mixture. Most generally, in all cases at least the fuel is ignited by the igniter, and then the ternary mixture is combusted upon ignition of the fuel.

A near-stoichiometric overall fuel/air ratio may be chosen, between 1 percent lean and 1 percent rich for example, thereby maximizing the flammable tolerance for steam. The exhaust gas temperature is also maximized near the stoichiometric fuel/air ratio. A near-stoichiometric fuel/air ratio that facilitates emissions cleanup with an exhaust catalyst may be chosen, between stoichiometric and 0.2 percent rich for example. In some cases, a slightly rich overall fuel/air ratio is chosen, about 5 percent rich for example, thereby suppressing NOx formation.

The flammable tolerance for steam may be raised by inclusion of a charge of supplemental oxygen with the air. About 3-13 additional moles of steam can be used per mole of pure oxygen supplied, depending on which fuel is used, 3 being the approximate ratio of steam to pure oxygen which is air-like in its combustion characteristics, and 13 being the approximate upper ratio at which hydrogen is readily combustible in a partial steam/oxygen mixture under engine firing conditions. Supplemental oxygen may be either pure gaseous oxygen, or any other gaseous mixture containing more than 21 percent oxygen by volume.

An addition of ammonia with air or with an air-like oxidizer, in a near-stoichiometric proportion, has a nearly neutral effect on combustibility and flame speed. U.S. Patent Application Publication No. 20110114069, incorporated herein by reference, discloses an operating map for running an engine on oxygen, ammonia, and air. U.S. Pat. No. 7,574,993, incorporated herein by reference, discloses an operating map for running an engine on air, ammonia, and another fuel. Operability is at least maintained when an air-like mixture of steam and oxygen is substituted for a portion of the air. An engine will run near a rough limit at a compression ratio of 12:1 and specific inputs of hydrogen/air, ammonia/pure oxygen, gasoline/air, or methane/air of 200, 400, 600 and 800 Joules per liter of swept volume, respectively, plus additional ammonia and air or air-like oxidizer with increasing load. Hence, an inclusion of supplemental oxygen renders the Ternary Mix Engine operable on ammonia as a fuel, in whole or in part. It follows that the invention is also operable on any well-behaved fuel that is more flammable than is ammonia, for example, an alcohol, natural gas, propane, gasoline, hydrogen, etc.

The inner surfaces of the working chamber need not be insulated. Instead, heat that is lost from the working fluid is simply allowed to conduct through the working chamber boundaries in a conventional manner, and this heat is absorbed and then rejected by the engine block, possibly at an elevated temperature. The thermal inertia of even the best solid insulators is much larger than the thermal inertia of air and other gases at a broad range of gas pressures, lower than 1000 bars for example. Therefore, a partially or fully insulated working chamber is not effective for increasing the thermal efficiency of a non-isothermal engine.

According to a particular embodiment of the Ternary Mix Engine, a steam generator is provided, which gathers water by condensing the water from the exhaust, by means known to the art. Liquid water, condensed near ambient temperature, is pressurized by a pump and then preheated through a low temperature range, using heat obtained from a lower portion of the exhaust conduit. Heat, obtained from the engine block at a middle temperature range, is used for vaporizing the water. Finally, the vaporized water is superheated through a high temperature range, using heat obtained from an upper portion of the exhaust conduit, wherein the upper portion is upstream in exhaust flow from the lower portion. The condensed water is thereby pressurized, preheated, vaporized, and superheated by the steam generator, using engine exhaust heat and possibly also heat rejected by the engine block.

The outside of the engine block may be insulated, thereby conserving heat and maximizing the heat available for generating steam. A heat transfer fluid, oil for example, which is separate from the water or steam, may be used for transferring heat from the engine block to the steam generator. In some cases, only exhaust heat is used for generating the steam, and the engine block is cooled in the conventional manner at all times.

The steam generator may be stored empty while the engine is not operating, thereby preventing damage from freezing. Otherwise, the steam generator may store liquid or frozen water in one or more "V" shaped troughs, thereby maintaining the availability of water for the next start. All pumps or other damage prone areas may be drained or purged with air or steam at shutdown, thereby preventing damage from freezing. The engine may revert to firing without steam admission at startup until enough heat and water accumulate, such that the steam generator becomes operational.

The Ternary Mix Engine may incorporate a supercharger, a turbocharger, or an exhaust blowdown turbine, or any combination of these or other turbocompounding devices known to the art. An exhaust turbine may gather work from the exhaust blowdown pulses, with or without significant average backpressure. Work gathered by an exhaust turbine may be used for driving an intake turbine or other intake supercharging device, or a portion of the work that is gathered by an exhaust turbine may be coupled directly onto the crankshaft or other power take-off, by means known to the art.

The Ternary Mix Engine can achieve efficiencies exceeding 50 percent. However, calculations showed that, in order to reach 50 percent, a large quantity of steam must be used, substantially all of the heat that is rejected by the engine must be recovered by the steam generator, and the exhaust blowdown work must also be substantially recovered by one or more exhaust turbines. A steam/air mole ratio greater than about 0.5 must be used if the steam generator is to recover and utilize at least a majority of the heat that is rejected by the engine, and this quantity of steam can ordinarily be used only if the fuel is hydrogen, or contains a substantial fraction of hydrogen.

BRIEF DESCRIPTION OF THE DRAWINGS

In order that the advantages of the Ternary Mix Engine will be readily understood, a more particular description of the invention briefly described above will be rendered by reference to specific embodiments which are illustrated in the appended drawings. Understanding that these drawings depict only exemplary embodiments of the disclosed subject matter and are not therefore to be considered to limit the scope of the disclosed subject matter, the subject matter of the present application will be described and explained with additional specificity and detail through the use of the accompanying drawings, in which.

DETAILED DESCRIPTION OF THE PREFERRED EMBODIMENTS

Figure 1:
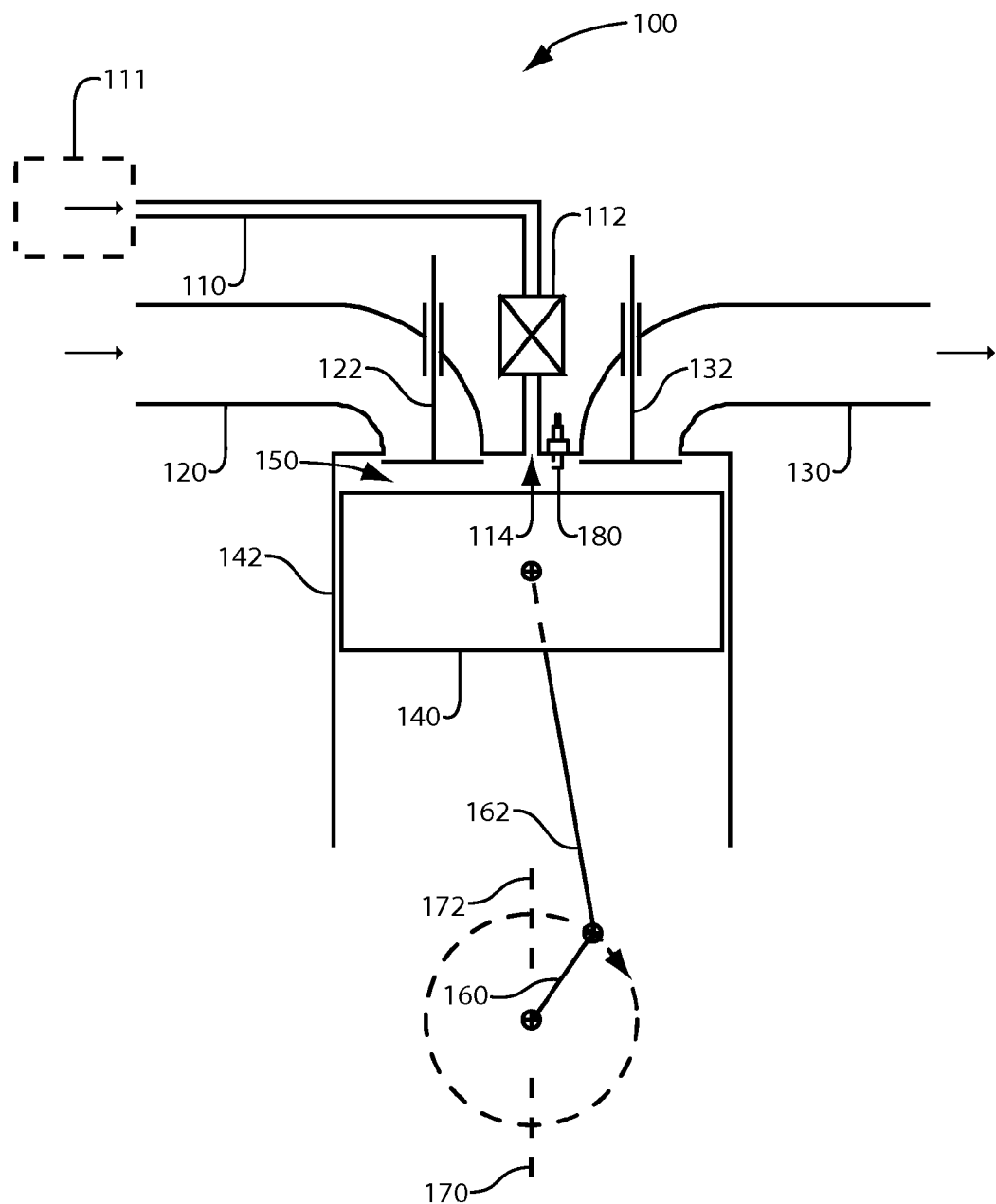
FIG. 1 is a schematic diagram of a representative embodiment of the Ternary Mix Engine.

FIG. 1 illustrates a representative embodiment of the Ternary Mix Engine. The engine 100 has a working chamber 150 and an igniter 180. The working chamber 150 comprises a cylinder 142, which serves as a fixed boundary, and a piston 140, which serves as a movable boundary for performing compression and expansion of a working fluid. The piston 140 is coupled to a rotating crankshaft 160 by a connecting rod 162 in a conventional manner. In this particular example, bottom center corresponds to a crankshaft position 170, and the end of expansion also happens to correspond to crankshaft position 170. Top center corresponds to a crankshaft position 172, and for 4-cycle operation, the end of exhaust/beginning of intake also happens to correspond to crankshaft position 172. However, for a different engine type, such as a rotary engine, bottom center and the end of expansion may be different working chamber positions, bottom center referring herein to the beginning of compression.

Most generally, a working cycle comprises decreasing the volume of the working chamber 150 during a compression time interval beginning at bottom center 170 and ending at top center 172, combustion of a fuel-containing mixture near top center 172, and expansion of the combusted mixture after top center 172, thereby obtaining work. This description allows for the possibility that the intake valve 122 or exhaust valve 132 may be open during an early portion of the compression time interval, such that the volume of the working chamber 150 may be decreased without compressing a gas during an early portion of the compression time interval.

The piston 140 moves up throughout the entire duration of the compression time interval beginning at bottom center 170 and ending at top center 172, and the working chamber 150 also performs compression of a fuel-containing mixture during at least a late portion of the compression time interval. The fuel is ignited by the igniter 180, and the fuel-containing mixture is combusted under compression near top center 172. The working chamber 150 expands the combusted mixture after top center 172.

Oxidizers such as air or supplemental oxygen, fuels, or buffer gases may be drafted into the working chamber 150 through the intake conduit 120. At least one admission valve 112 and source of pressurized gas 111 are provided for admitting pressurized, superheated steam into the working chamber 150. In this case, the source of pressurized gas 111 comprises a steam generator 500, and the pressurized gas comprises the steam 511. Additional admission valves, similar to the admission valve 112, may be provided for admitting direct injected fuels or direct injected oxidizers into the working chamber 150. Exhaust gas leaves the working chamber 150 through the exhaust conduit 130. The small arrows show the direction of flow.

The admission valve 112 may comprise any of the various combinations of fast and slow acting valves, restrictors, throttles, pressure regulators, plenums, springs, levers, solenoids or magnetostrictive or piezoelectric elements known to the art. In one example, a piezoelectric element is provided for driving the admission valve 112 open and closed. The admission valve 112 may be self-contained as shown, or it may include distributed components that extend outside the region shown, such a poppet valve, pintle, or plug (not shown) that covers inlet 114. At least one source of pressurized gas 111 provides pressurized and superheated steam to the admission valve 112, through delivery conduit 110. The delivery conduit 110 and admission valve 112 may be constructed of, or lined with, an insulating material, which prevents loss of heat from the steam and condensation of the steam.

In one example, the mass of steam admitted into the working chamber 150 per cycle is controlled by a chosen combination of pressure in the delivery conduit 110 and dwell time for opening the admission valve 112. In another example, the delivery conduit 110 has a substantially constant steam pressure that is higher than the highest pre-combustion pressure of the engine, about 20 to 100 bars or higher, and the mass of steam admitted per cycle is controlled by the dwell, lift, or other setting of the admission valve 112. In another example, the admission valve 112 is opened at a fixed or variable crank angle interval by a cam actuator similar to cam actuators commonly used for opening and closing intake and exhaust valves, and the mass of steam admitted into the working chamber 150 per cycle is controlled by a chosen pressure in the delivery conduit 110, or by one or more settings of the admission valve 112. Any of the described mechanisms for operating one or more admission valves 112 may be deactivated when necessary or desired, for example, at startup.

During a warm-up period, or whenever necessary, liquid water may be cleared from the delivery conduit 110 and admission valve 112, by opening the admission valve 112 at the end of expansion or while the exhaust valve 132 is open, thereby removing the liquid water without causing misfire or loss of power. In another example, liquid water is allowed to drain backward before reaching the admission valve 112 or inlet 114.

An example of the engine 100 was constructed from a 50 mL displacement, 4-cycle, spark-ignited, air-breathing leaf blower engine using drafted fuel and having a single reciprocating piston 140 coupled to a rotating crankshaft 160. The leaf blower engine provided excellent proof-of-principle results at minimal equipment cost. These results are applicable to a broad range of engine sizes. In this particular example, an operating cycle begins with the crankshaft 160 at position 172. The intake valve 122 opens and a substantially homogeneous mixture of fuel and air is drafted into the working chamber 150 as the piston 140 moves down within the cylinder 142 until the crankshaft 160 reaches position 170. The intake valve 122 closes and the piston 140 moves up during a compression time interval beginning at crankshaft position 170 and ending at crankshaft position 172. Within a late portion of the compression time interval, the admission valve 112 opens and closes, thereby allowing a controlled mass of carbon dioxide (surrogate steam, hereafter referred to as steam) to enter the working chamber 150 through inlet 114. After the admission of simulated steam has ceased, the fuel is ignited by the igniter 180 and a ternary mixture comprising the fuel, the air, and the steam, is combusted. The crankshaft 160 moves from position 172 to position 170 while the piston 140 moves down to expand the combusted mixture, thereby obtaining work. The exhaust valve 132 opens when the crankshaft 160 reaches position 170 and the expanded mixture exits the working chamber 150 as the piston 140 moves up until the crankshaft 160 reaches position 172. Finally, the exhaust valve 132 closes, and the above cycle is repeated.

Figure 2:
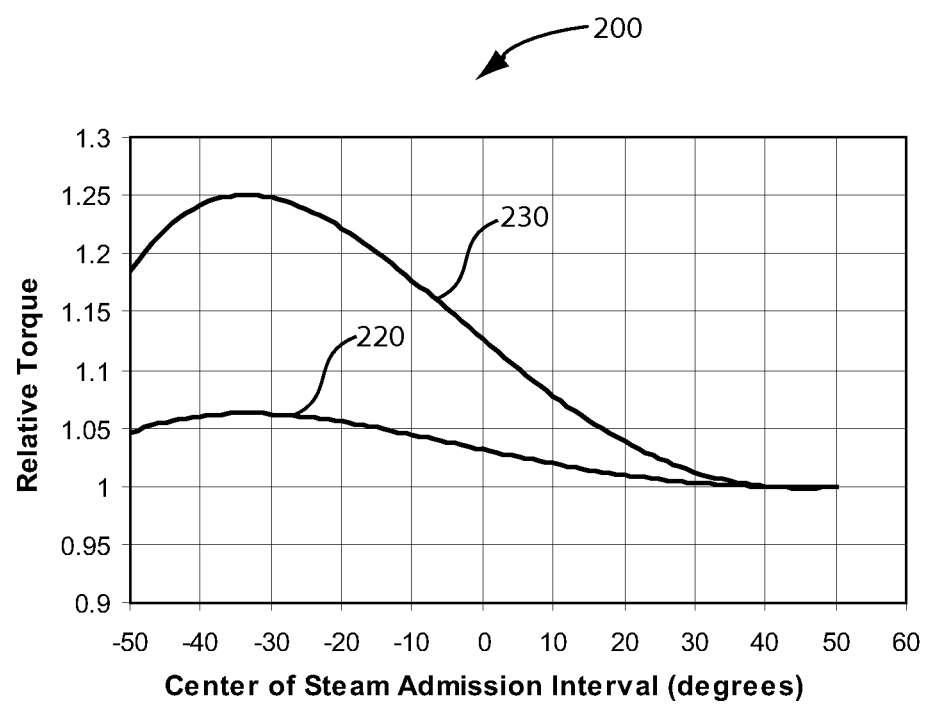
FIG. 2 is a graph showing the measured engine torque as a function of steam admission timing for a representative example.

FIG. 2 illustrates a graph 200 showing experimental torque measurements obtained from the leaf blower engine described above. The leaf blower's fan assembly was left in place, and the fan assembly was used, in combination with crankshaft rotation speed measurements, for measuring changes in torque. Torque is approximately proportional to the square of the crankshaft rotation speed in this setup. A solenoid-actuated pintle valve was used as the admission valve 112. The pintle valve's solenoid was driven by power electronics incorporating a movable crankshaft position sensor, which imparted a constant dwell of about 40 degrees crank angle. The center of the steam admission interval was controlled by the placement of the crankshaft position sensor. A tank of carbon dioxide and a pressure regulator were used as the source of pressurized gas 111. The pressure of the gaseous carbon dioxide was regulated down from the tank pressure, and then the carbon dioxide was fed into the delivery conduit 110 at the regulated pressure ranging from about 20 to 60 bars, and at a temperature of about 50° C. The mass flow of carbon dioxide per cycle was controlled by varying the regulated pressure of the carbon dioxide in conduit 110.

The engine was run at a crankshaft speed of about 4000-4600 revolutions per minute, a load corresponding to normally aspirated, wide open throttle, and a near-stoichiometric fuel/air equivalence ratio. The carbon dioxide (surrogate steam) was flowed straight down into the center of the working chamber 150 through a narrow, round steam inlet 114, as shown in 100. The engine behaves as though the mixing, of the fuel, air, and steam, is substantially homogeneous with this configuration. However, a different configuration for the steam inlet 114 could have been used. For example, the steam inlet 114 could have been placed off center, and the flow could have been angled such that swirl is induced by the flow of steam into the working chamber 150, thereby further promoting mixing of steam throughout the substantial bulk of the working fluid. The igniter 180 was a spark plug, which was placed at the top and side edge of the cylinder 142.

The mass of steam admitted per cycle was set, such that the torque was maximized with respect to the mass of steam admitted, for a steam admission interval centered at −30 degrees crank angle. The location of the center of the steam admission interval was then varied, and the torque of the engine was graphed as a function of the location of the center of the steam admission interval. Torque curves for drafted hydrogen 230 and drafted propane 220 are shown. Negative horizontal-axis numbers correspond to events that occur in compression, and positive numbers correspond to events that occur in expansion. For example, if the center of the steam admission interval is −30 degrees crank angle, then the steam was admitted into the engine, beginning at −50 degrees crank angle and ending at −10 degrees crank angle, which is within the compression time interval. The torque is normalized, such that the torque without steam admission is set equal to 1. Relative torque in excess of 1 indicates an efficiency gain. A relative torque equal to 1 indicates zero efficiency gain due to steam admission.

The greatest relative torque for both hydrogen and propane occurred when the steam admission interval was centered about −30 degrees crank angle. It appears that an appreciably diminished efficiency gain is obtained for any portion of steam admitted earlier than −60 degrees crank angle or later than 0 degrees crank angle. The interval from −60 degrees crank angle to 0 degrees crank angle is the final one third of the compression time interval. The net additional work recovered from the steam is maximized only for steam that is flowed into the working chamber 150 within the final one third of the compression time interval. The steam admission timing criterion, as expressed in relation to time, can now be applied to a broad range of engine types, such as offset piston engines, radial engines, rotary engines, and also to engines that do not have a defined crank angle, free piston engines and some gasifier engines for example.

If any portion of the steam is admitted too early, then the subsequent effective expansion is low for that portion of the steam, and the efficiency gain is low. If any portion of the steam is admitted too long after ignition of the fuel, then that portion of the steam causes a large convective heat loss from the partially burned working fluid, and the efficiency gain is also low. A small portion of the steam may be admitted slightly after ignition of the fuel without causing too much additional convective heat loss. However, in order to obtain the substantial efficiency gain that is the object of the Ternary Mix Engine, at least a majority of the steam is flowed into the working chamber 150 within the final one third of the compression time interval and before ignition of the fuel. Preferably, the entire portion of the steam is flowed into the working chamber 150 within the final one third of the compression time interval and before ignition of the fuel.

The same conclusions about efficiency gain and timing of gas admission are applicable to any gas that is admitted into the working chamber 150, including a direct injected gaseous fuel or oxidizer. In order to obtain the best performance, to maximize ignitability, and to maximize the flammable tolerance for steam, at least a majority of the total fuel and at least a majority of the total oxidizer are flowed into the working chamber 150 before ignition of the fuel. This description allows for the possibility of igniting the fuel with a comparatively small quantity of a direct injected, hypergolic fuel or hypergolic oxidizer, which autoignites upon admission into the working chamber 150. In some cases, all entire portions of fuel and oxidizer are flowed into the working chamber 150 before ignition of the fuel. In some cases, all entire portions of all direct injected gases are flowed into the working chamber 150 within the final one third of the compression time interval and before ignition of the fuel.

The greatest torque gain for propane occurred at a steam/air mole ratio of about 0.2. Propane was found to misfire when the steam input was increased from there. The torque results for hydrogen were obtained at a steam/air mole ratio of about 0.6. Hydrogen appears to tolerate a steam/air mole ratio in excess of 0.6 without misfiring. A combustible mixture's flammable tolerance for steam is one of the Ternary Mix Engine's operating constraints. The substantial bulk of the yet-to-be-burned working fluid, comprising steam, fuel and air, must support flame propagation. A greater mass of steam can be used with hydrogen, than can be used with a hydrocarbon, for comparable operating points.

The relative torque for drafted propane 220 shows a maximum efficiency gain of 7 percent. However, the relative torque for drafted hydrogen 230 shows a much larger maximum efficiency gain of 25 percent. Calculations show that relative torque gains of 15 percent and 5 percent for hydrogen and propane, respectively, can be attributed to the pressure rise that is directly associated with the admission of the steam. The remaining torque gains are attributed to indirect efficiency gains obtained through lowering of the peak flame temperature by the steam.

The efficiency gain was about 3 times larger for hydrogen than it was for propane, because about 3 times as much steam could be used with hydrogen than could be used with propane, when supplemental oxygen is not used. The portion of the torque gain that is directly attributed to the pressure rise, associated with the admission of the steam, is proportional to the mass of steam admitted, times the absolute temperature of the steam. The maximum torque (efficiency) factors of 1.25 and 1.07 for hydrogen and propane, respectively, become 1.46 and 1.10 when the effects of steam admission temperatures of 500° C. and 300° C., respectively, are taken into account. Temperature limits of 500° C. and 300° C. for hydrogen and a hydrocarbon, respectively, are chosen in this analysis because the autoignition temperatures of hydrogen and gasoline are about 500° C. and 300° C., respectively. In practice, the maximum permitted steam admission temperature may differ somewhat from the listed autoignition temperature of a fuel. Notably, the autoignition temperatures of methane, hydrogen, and ammonia are higher than the critical temperature of water.

Figure 3:
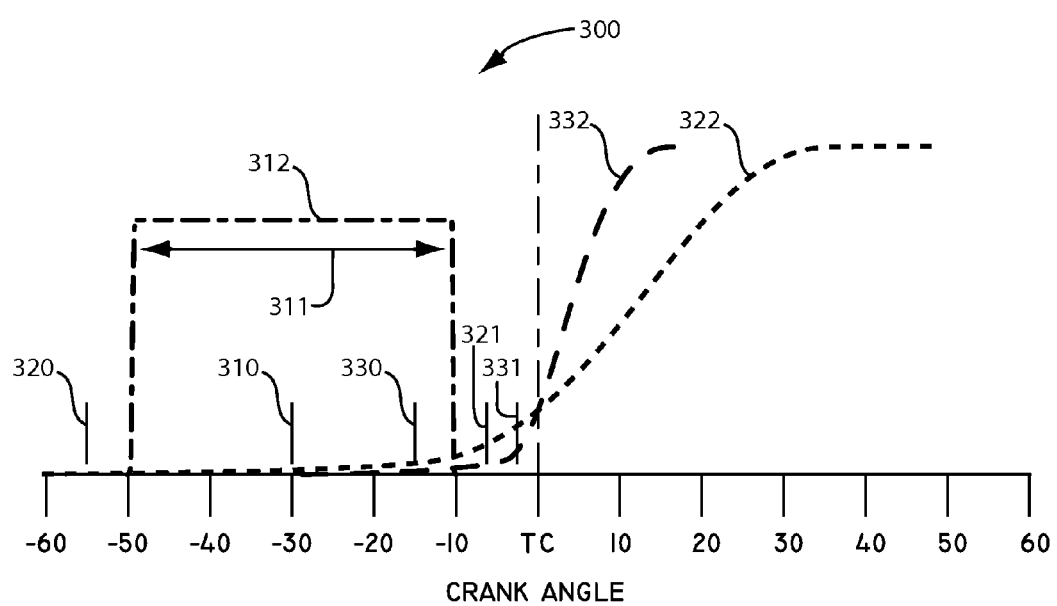
FIG. 3 is a graph showing the relative phasing of the steam admission interval, ignition events, and fuel combustion for a representative example.

FIG. 3 illustrates a graph 300 showing the relative phasing of steam admission among the various ignition and combustion events. The steam admission interval 312 has a center 310 at −30 degrees crank angle, and a dwell 311 of 40 degrees crank angle, such that steam is admitted between −50 and −10 degrees crank angle. This result is based on measurements performed on the leaf blower engine, in which the dwell 311 was 40 degrees crank angle and the torque gain, due to steam admission, was maximized when the center 310 of the steam admission interval 312 was −30 degrees crank angle. A different choice of part dimensions and dwell 311 may produce a slightly different result for optimum placement of the center 310. For example, if the dwell 311 were shortened from 40 degrees to 20 degrees crank angle, it may be found that the optimum position of center 310 is −20 degrees instead of −30 degrees crank angle, such that steam is admitted between −30 and −10 degrees crank angle. If the spark timing is chosen such that ignition occurs at top center (TC) or later, and the compression ratio is low, for example a ratio of 6:1 or less, then a steam admission interval may be usefully placed within a crank angle range of about −70 to +10 degrees crank angle.

Mass fraction burned curves are shown for hydrogen 332, and propane 322. The overall phasing, of the mass fraction burned curves 322 and 332, is chosen, such that the partial work yield, directly attributed to combustion of the fuels, is maximized. The rising portion of the curve for hydrogen 332 is shorter in the horizontal dimension than is the rising portion of the curve for propane 322 because hydrogen burns faster than propane. The admission of steam may disturb the shape and position of curves 322 and 332, but this can be compensated by changing the spark advance. The ignition points for hydrogen 331 and propane 321 occur after the end of the steam admission interval 312. The locations of the sparks for hydrogen 330 and propane 320 are also shown. The ignition delay for hydrogen occurs between the spark 330 and ignition 331, and the ignition delay for propane occurs between the spark 320 and ignition 321.

Sparks may occur before, within or after a steam admission interval. However, the combination of spark timing and steam admission timing is chosen such that ignition 321 and 331 occurs near or after the end of the steam admission interval 312. For an engine having a piston coupled to a rotating crankshaft, the optimal timing of ignition is typically within a range of −20 to 0 degrees crank angle, which is the final one ninth of the compression time interval. The performance of the engine is degraded significantly if the fuel is ignited earlier than −30 degrees or later than 10 degrees crank angle. Most broadly, the fuel is ignited within or after the final one third of the compression time interval. The timing of ignition is further restricted from there by performance optimization constraints and by the timing of steam admission.

Figure 4:
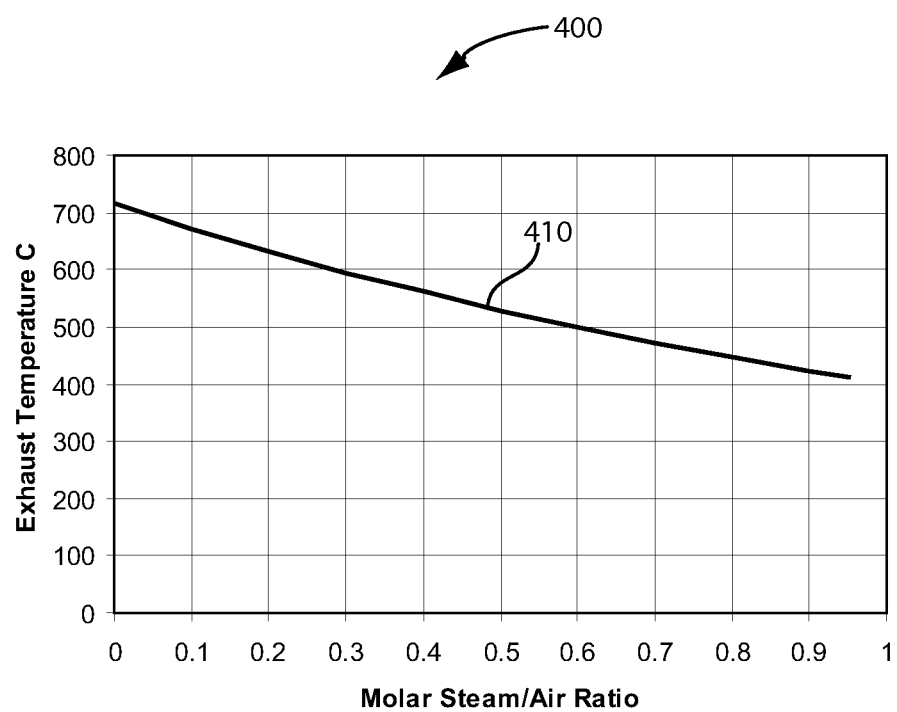
FIG. 4 is a graph showing the exhaust gas temperature as a function of steam/air mole ratio for a representative example.

FIG. 4 illustrates a graph 400 showing the exhaust gas temperature 410, of the burned working fluid, upon leaving through the exhaust valve 132 of the engine 100. Curve 410 represents a particular example, in which the engine is operating at high load. At other loads, an engine may behave similarly for a given steam/air ratio. An engine may operate with an approximately constant steam/air ratio or steam/fuel ratio.

In the calculation of the exhaust gas temperature 410, it is assumed that the steam is heated up to, and not beyond, the exhaust gas temperature 410. The exhaust gas temperature 410 goes down with an increasing steam/air mole ratio, because the addition of steam increases the total moles of gas sharing the heat that is released by combustion of the fuel. The leftmost point on curve 410 corresponds to zero steam admission, and the temperature at that point is a measured exhaust gas temperature in one example. Steam admission is treated as a perturbation on known engine operating parameters. The rightmost point on curve 410 corresponds to an energy limit, at which the total heat, yielded by the engine block and exhaust, is just sufficient to produce the quantity of steam shown, at the temperature shown. If engine block heat is not used, then curve 410 ends at a steam/air mole ratio of 0.65, rather than 0.95 as shown. Curve 410 thus shows an upper limit of the combinations of quantity and temperature of steam that can be produced, in this example.

Combinations, of steam/air mole ratio and steam admission temperature, below curve 410, may be obtained by spoiling the performance of a steam generator in a controlled way, using bypasses, shutters, or by other means known to the art. The performance of the steam generator 500 may be spoiled by partially or fully bypassing at least one side of heat exchangers 501 or 503 for example. The steam admission temperature may thereby be reduced, as required, to ensure that the steam does not ignite the fuel. In some cases, it is not necessary to spoil the performance of the steam generator. The steam admission temperature can be lowered without spoiling, by using a lean fuel/air mixture or by using a quantity of steam exceeding the maximum quantity of steam that can be superheated up to the exhaust gas temperature 410, in which case the steam admission temperature will be lower than the exhaust gas temperature 410. A slight excess of steam may be used, such that the steam generator can gather all available heat.

For gasoline, the combination, of a steam/air mole ratio of 0.2 and steam admission temperature of 300° C., occurs far below curve 410, and is therefore well within the limits of quantity and temperature of steam that can be produced in this example. However, the utilization of available heat is low, significant spoiling is required, and the efficiency gain is modest. For hydrogen, the combination, of a steam/air mole ratio of 0.6 and steam admission temperature of 500° C., occurs near curve 410, and thus occurs near the limits of quantity and temperature of steam that can be produced in this example. The utilization of available heat is high, significant spoiling is not required, and the efficiency gain is large. The efficiency gain for hydrogen can be made even larger by using more steam, yielded at a lower steam admission temperature, for example, a steam/air mole ratio of 0.8 and steam admission temperature of 450° C., according to curve 410.

Figure 5:
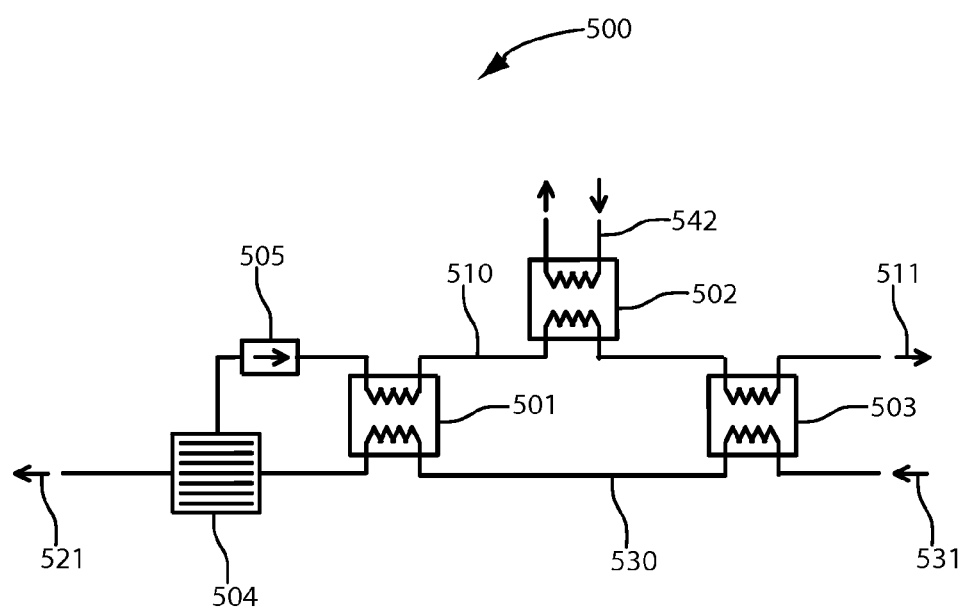
FIG. 5 is a schematic diagram of a steam generator.

FIG. 5 shows a schematic diagram of a steam generator 500. The steam generator includes a first 501, second 502, and third 503 heat exchangers for heating water, which flows through these heat exchangers in that order. Exhaust gas 531 flows through the third 503 and first 501 heat exchangers, in that order. The exhaust conduit 530 is an extension of the exhaust conduit 130. One or more exhaust turbines, or an exhaust catalyst, (not shown) may be present in the exhaust conduit 530, upstream in the exhaust flow from the third heat exchanger 503. In some cases it may be more convenient to place one or more exhaust turbines in the exhaust conduit 530 between the first 501 and third 503 heat exchangers. The first heat exchanger 501 is downstream of the third heat exchanger 503 in the exhaust flow. Hence, the first heat exchanger 501 is said to use heat that is obtained from a lower portion of the exhaust conduit 530, and the third heat exchanger 503 is said to use heat that is obtained from an upper portion of the exhaust conduit 530. Water is preheated, vaporized, and superheated in the steam conduit 510. The steam conduit 510 is an extension of the delivery conduit 110 when the steam generator 500 is used as the source of pressurized gas 111. Liquid water, obtained from the condenser 504, is transformed into dry, superheated steam 511, which continues on toward the admission valve 112.

Liquid water is obtained by condensing water from the exhaust gas at a near-ambient temperature and pressure, using a condenser 504. Ambient air is flowed over the outside of the condenser 504, thereby cooling it. The temperature of the condenser 504 can be regulated, thereby maintaining a desired temperature range. In one example, the temperature of condenser 504 is maintained above the freezing temperature of water. A fan (not shown), or a shutter (not shown) may be used for controlling the air flow over the condenser 504, for the purpose of regulating the temperature of the condenser 504. The shutter may be opened or closed, or the fan may be turned on or off, in response to the temperature of the condenser 504. A pump 505 raises the pressure of the now-condensed, liquid water, and pumps the water into the pressurized steam conduit 510.

The liquid water is preheated through a low temperature range in the first heat exchanger 501. A portion of the water may also be vaporized in the first heat exchanger 501. The exhaust gas 531 may be chilled down to a near-ambient temperature in the first heat exchanger 501. The water is substantially vaporized in the second heat exchanger 502. The engine block delivers a substantial quantity of heat, through loop 542, at a middle temperature range which may be narrow. Water's large latent heat of vaporization makes it particularly well-suited for absorbing a substantial quantity of heat that is delivered at a narrow temperature range. The boiling temperature in the second heat exchanger 502 is determined by the pressure in the steam conduit 510. For example, water boils at about 250° C. when the pressure is 40 bars. Higher steam pressures can be obtained by using higher temperatures at the location where the water is boiled.

An engine block temperature of about 250 to 350° C. is appropriate for vaporizing the water at a broad range of pressures. If the change from liquid to vapor occurs substantially in the second heat exchanger, then the temperature of the engine block will be at least slightly higher than the boiling temperature of the steam. The engine block temperature will thus be high enough to ensure that the steam remains fully vaporized when the steam is flowed into the working chamber 150. The pump 505 may be controlled to maintain a constant level of water in the second heat exchanger 502.

The vaporized water (steam) is superheated through a high temperature range in the third heat exchanger 503. The temperature of the superheated steam 511 can be no higher than the temperature of the exhaust gas 531 entering the third heat exchanger 503. Ideally, all of the available heat, from the engine block and exhaust gas 531, is incorporated into the superheated steam 511. The highest possible thermal efficiency is obtained, when all of the heat that is rejected by the engine, is gathered by the steam generator 500, and when substantially all of the heat that is rejected by the steam generator 500, is rejected near ambient temperature, principally through the condensation of water in the condenser 504. A water-depleted exhaust gas 521 may be vented to the atmosphere. If a recirculated buffer gas is used, then the water-depleted exhaust gas 521, comprising mostly the buffer gas, is further dried and returned to the intake conduit 120.

A pressurized gaseous fuel or pressurized gaseous oxygen may be introduced into the steam conduit 510, possibly between the second 502 and third 503 heat exchangers, or at another location chosen for appropriate temperature matching. The resulting steam-containing mixture is superheated in the third heat exchanger 503 before admission into the working chamber 150 through the admission valve 112.

A proper heat balance can be obtained by controlling the mass flow of steam 511, such that the heat carried away by the steam 511 is commensurate with the heat yielded by the engine block and exhaust, and this may entail using somewhat more steam than can be superheated to the temperature of the exhaust gas 531 entering the third heat exchanger 503. Heat balance can also be achieved by spoiling the performance of one or more elements of the steam generator in a controlled way, by removing some of the heat by conventional cooling, or by allowing excess heat to be dissipated in the condenser 504.

Figure 6:
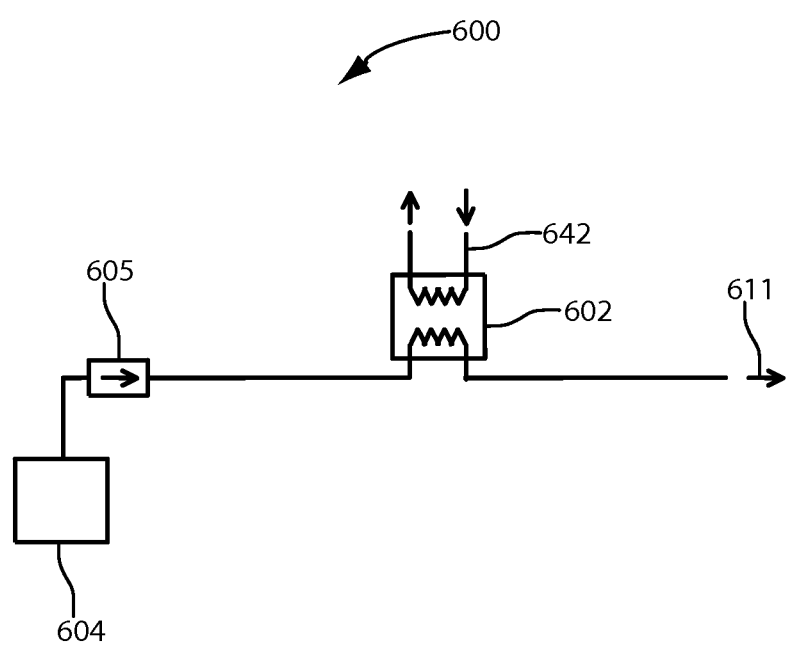
FIG. 6 is a schematic diagram of a source of pressurized gas.

FIG. 6 shows a schematic diagram of a source of pressurized gas 600. The gas may be either a fuel or oxygen. A cryogenic liquid such as hydrogen, methane or oxygen is drawn from a storage tank 604 and pressurized to about 50 to 100 bars by a pump 605. The pump 605 may be placed within the tank 604 to prevent cavitation. The pumped liquid is vaporized under pressure in a heat exchanger 602. A hot or warm fluid may be circulated through the heat exchanger 602 in a heating loop 642. In some cases, the heat exchanger 602 is an evaporator, over which ambient air or water is flowed. The pressurized, gaseous fuel or oxygen 611 may continue on toward an admission valve, similar to the admission valve 112, in which case the source of pressurized gas 600 is a more particular example of a source of pressurized gas 111.

Otherwise, the pressurized gas 611 continues on toward a point of introduction into the steam conduit 510, the content of which is destined for the admission valve 112. In one example, the source of pressurized gas 600 is controlled to maintain a constant total pressure in the steam conduit 510, and the pump 505 is controlled to maintain a constant level of liquid water in heat exchanger 502. In this case, the source of pressurized gas 600 and the steam generator 500 are combined into a more particular example of the source of pressurized gas 111.

Figure 7:
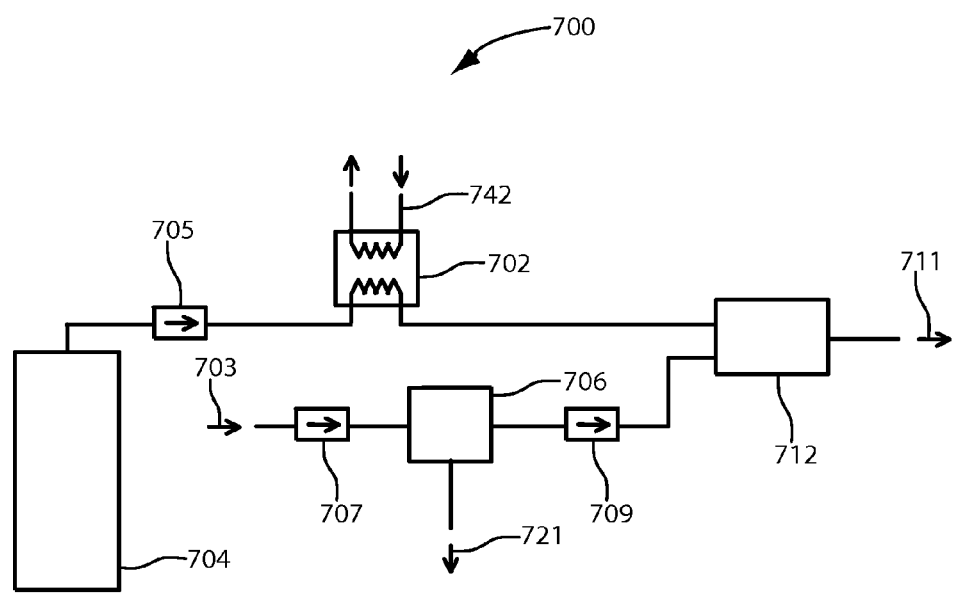
FIG. 7 is a schematic diagram of a source of pressurized hydrogen.

FIG. 7 shows a schematic diagram of a source of pressurized hydrogen 700. Liquid anhydrous ammonia is drawn from a tank of ammonia 704 and pressurized to about 50 to 100 bars by a pump 705. The pumped liquid is vaporized under pressure in a heat exchanger 702. A hot or warm fluid, such as engine coolant, is circulated through the heat exchanger 702 in a heating loop 742. About one half of the heat that is typically lost from the working fluid, to the boundaries of the working chamber 150, is required for preheating and vaporizing the ammonia at a temperature higher than 90° C. at a pressure of 50 bars, or higher than 130° C. at a pressure of 100 bars.

Air 703 is pressurized to about 3 bars by pump 707 and fed into a pressure swing adsorption unit 706, which separates the air 703 into oxygen, which is further pressurized to about 50 to 100 bars by pump 709, and nitrogen 721, which is vented to the atmosphere. Less than half as much work is required to extract and isothermally pressurize oxygen, than to isothermally pressurize a chemically equivalent quantity of air. Also, the pressurized hydrogen-containing gas mixture 711 has a lower inert fraction and higher flammable tolerance for steam if oxygen is used by the Ammonia Flame Cracker 712, than it would have had if air were used.

The Ammonia Flame Cracker 712 accepts the pressurized gaseous ammonia and pressurized gaseous oxygen from the vaporizer 702 and pump 709, respectively. Additional means of ratio control and overall mass flow control (not shown) may be provided. The Ammonia Flame Cracker 712 may comprise the structure shown in FIG. 9 of U.S. Patent Application Publication No. 2012/0276463, which separately preheats the ammonia and the oxygen, combines them, and combusts them to autothermally decompose the ammonia, thereby forming the pressurized hydrogen-containing gas mixture 711, which is cooled by the Ammonia Flame Cracker 712 in conjunction with the preheating of the next incoming ammonia and oxygen. Separate preheating allows a high preheat energy state to be reached, because the ammonia cannot ignite until it is combined with the oxygen after preheating. The Ammonia Flame Cracker 712 may be partially or fully non-catalytic and operate at a peak temperature higher than 1200° C., and preferably higher than 1400° C., or it may be fully catalytic and operate at an unspecified temperature. The pressurized hydrogen-containing gas mixture 711 may continue on toward an admission valve, similar to the admission valve 112, in which case the source of pressurized hydrogen 700 is a more particular example of a source of pressurized gas 111.

Otherwise, the pressurized hydrogen-containing gas mixture 711 continues on toward a point of introduction into the steam conduit 510, the content of which is destined for the admission valve 112. In one example, the source of pressurized hydrogen 700 is controlled to maintain a constant total pressure in the steam conduit 510, and the pump 505 is controlled to maintain a constant level of liquid water in heat exchanger 502. In this case, the source of pressurized hydrogen 700 and the steam generator 500 are combined into a more particular example of the source of pressurized gas 111.

At startup, the Ammonia Flame Cracker 712 may be operated at a near-ambient pressure, the hydrogen-containing gas mixture 711 may be drafted instead of direct injected, and the ammonia may be drawn from the tank 704 as a gas, until the vaporizer 702 and structures downstream of the vaporizer 702 have warmed up to a suitable operating temperature. After the vaporizer 702 has warmed up to a suitable operating temperature, the source of pressurized hydrogen 700 reverts to drawing ammonia from the tank 704 as a liquid, pressurized operation of the Ammonia Flame Cracker 712, and direct injection of the hydrogen-containing gas mixture 711.

The implementation of the Ternary Mix Engine produces a much larger efficiency gain for hydrogen than it does for a hydrocarbon. The greater efficiency obtained for hydrogen, as compared to the efficiency obtained for a hydrocarbon, is due to hydrogen's much higher flammable tolerance for steam, and higher autoignition temperature, as compared to most hydrocarbons. Hydrogen, stored as ammonia, can now favorably compete with gasoline on an engine fueling cost basis, for a higher range of ammonia/gasoline cost ratios. The following analysis is concerned only with cost ratios, and not the sources of energy that are used for making the ammonia and gasoline. Hence the cost-effective implementation of ammonia as a fuel need not be held back by delays in the development of nuclear energy. Ammonia manufacturers can simply use whatever source of energy is cheapest, easiest to obtain, or most effective for making the ammonia. In the United States, gasoline has recently sold at a retail price of $3.50-$4.00 per gallon, or about $1 per liter.

If the Ternary Mix Engine is not implemented and the engine efficiency is the same for hydrogen as it is for gasoline, then ammonia is evenly competitive with gasoline at $1 per liter when the retail price of ammonia is $570 per metric ton. If the Ternary Mix Engine is implemented for both hydrogen and gasoline, then the engine efficiency is 1.46/1.10=1.33 times higher for hydrogen than it is for gasoline, and ammonia is evenly competitive with gasoline at $1 per liter when the retail price of ammonia is $756 per metric ton. If the Ternary Mix Engine is implemented for hydrogen and not implemented for gasoline, then the engine efficiency is 1.46 times higher for hydrogen than it is for gasoline, and ammonia is evenly competitive with gasoline at $1 per liter when the retail price of ammonia is $832 per metric ton. The above calculations assume that hydrogen is obtained by the decomposition of ammonia in an Ammonia Flame Cracker, and that the ammonia-to-hydrogen conversion efficiency is 95 percent, on a lower heating value basis. The above cost structure may differ if supplemental oxygen is used with a hydrocarbon, depending on the autoignition characteristics of the particular hydrocarbon.

The present subject matter may be embodied in other specific forms without departing from its spirit or essential characteristics. The described embodiments are to be considered in all respects only as illustrative and not restrictive. The scope of the invention disclosed herein is, therefore, indicated by the appended claims rather than by the foregoing description. All changes which come within the meaning and range of equivalency of the claims are to be embraced within their scope.

Having described our invention, we claim:

1. A method of operating an internal combustion engine having a working chamber and an igniter, the working chamber defining a variable volume having a bottom center and a top center, comprising the steps of:
    flowing air into the working chamber;
    compressing the air by the working chamber within a compression time interval beginning at bottom center and ending at top center;
    flowing hydrogen into the working chamber;
    igniting the hydrogen by the igniter within or after the final one third of the compression time interval;
    flowing pressurized, superheated, and fully gaseous steam into the working chamber within or after the final one third of the compression time interval and before the ignition of the hydrogen, thereby forming a substantially homogeneous ternary mixture under compression, the ternary mixture comprising the hydrogen, the air, and the steam, wherein:
    (a) the mole ratio, of gaseous water to hydrogen present in the working chamber immediately before the ignition of the hydrogen, is greater than 0.5,
    (b) the mole ratio, of gaseous water to oxygen present in the working chamber immediately before the ignition of the hydrogen, is greater than 1, and
    (c) the mole ratio, of hydrogen to oxygen present in the working chamber immediately before the ignition of the hydrogen, is greater than 1;
    combusting the ternary mixture upon the ignition of the hydrogen;
    expanding the combusted mixture by the working chamber after top center, thereby obtaining work augmented by the steam; and
    flowing the expanded mixture out of the working chamber.

2. The method of claim 1, wherein the mole ratio, of hydrogen to oxygen present in the working chamber immediately before the ignition of the hydrogen, is greater than 1.5.

3. The method of claim 2, wherein the mole ratio, of gaseous water to hydrogen present in the working chamber immediately before the ignition of the hydrogen, is greater than 0.75.

4. The method of claim 2, wherein the mole ratio, of gaseous water to hydrogen present in the working chamber immediately before the ignition of the hydrogen, is greater than 1.

5. The method of claim 1, wherein the mole ratio, of hydrogen to oxygen present in the working chamber immediately before the ignition of the hydrogen, is greater than 1.9 and less than 2.1.

6. The method of claim 5, wherein the mole ratio, of gaseous water to hydrogen present in the working chamber immediately before the ignition of the hydrogen, is greater than 0.75.

7. The method of claim 5, wherein the mole ratio, of gaseous water to hydrogen present in the working chamber immediately before the ignition of the hydrogen, is greater than 1.

8. The method of claim 1, wherein the mole ratio, of gaseous water to hydrogen present in the working chamber immediately before the ignition of the hydrogen, is greater than 0.75.

9. The method of claim 1, wherein the mole ratio, of gaseous water to hydrogen present in the working chamber immediately before the ignition of the hydrogen, is greater than 1.

10. The method of claim 1, wherein all of the hydrogen is flowed into the working chamber with the air.

11. The method of claim 1, wherein all of the hydrogen is flowed into the working chamber within or after the final one third of the compression time interval and before the ignition of the hydrogen.

12. The method of claim 1, wherein the hydrogen is obtained by decomposing ammonia into a hydrogen-containing gas mixture that also contains nitrogen, and the nitrogen is flowed into the working chamber with the hydrogen.

13. A method of operating an internal combustion engine having a working chamber and an igniter, the working chamber defining a variable volume having a bottom center and a top center, comprising the steps of:
    decreasing the volume of the working chamber during a compression time interval beginning at bottom center and ending at top center;
    flowing hydrogen into the working chamber;
    flowing an oxygen-containing gas mixture into the working chamber;
    igniting the hydrogen by the igniter within or after the final one third of the compression time interval;
    flowing pressurized, superheated, and fully gaseous steam into the working chamber within or after the final one third of the compression time interval and before the ignition of the hydrogen, thereby forming a substantially homogeneous ternary mixture under compression, the ternary mixture comprising the hydrogen, the oxygen-containing gas mixture, and the steam, wherein:
    (a) the mole ratio, of gaseous water to hydrogen present in the working chamber immediately before the ignition of the hydrogen, is greater than 0.5,
    (b) the mole ratio, of gaseous water to oxygen present in the working chamber immediately before the ignition of the hydrogen, is greater than 1, and
    (c) the mole ratio, of hydrogen to oxygen present in the working chamber immediately before the ignition of the hydrogen, is greater than 1;
    combusting the ternary mixture upon the ignition of the hydrogen;
    expanding the combusted mixture by the working chamber after top center, thereby obtaining work augmented by the steam; and
    flowing the expanded mixture out of the working chamber.

14. The method of claim 13, wherein the oxygen-containing gas mixture is air and the air is compressed by the working chamber within the compression time interval.

15. The method of claim 13, wherein the mole ratio, of hydrogen to oxygen present in the working chamber immediately before the ignition of the hydrogen, is greater than 1.9 and less than 2.1.

16. The method of claim 13, wherein the mole ratio, of gaseous water to hydrogen present in the working chamber immediately before the ignition of the hydrogen, is greater than 0.75.

17. The method of claim 13, wherein the mole ratio, of gaseous water to hydrogen present in the working chamber immediately before the ignition of the hydrogen, is greater than 1.

* * * * *